United States Patent
Mundy

[11] Patent Number: 5,904,356
[45] Date of Patent: May 18, 1999

[54] LABYRINTH SEAL WITH CONTAMINANT PURGING PASSAGEWAY FOR BEARING HOUSINGS

[76] Inventor: David R. Mundy, 62 Pezzack Street, Cambridge, Ontario, Canada, N3C 3R8

[21] Appl. No.: 08/927,275

[22] Filed: Sep. 11, 1997

Related U.S. Application Data

[60] Provisional application No. 60/025,182, Sep. 11, 1996.

[51] Int. Cl.[6] ................................................ F01D 11/04
[52] U.S. Cl. ............................ 277/431; 277/417; 384/478
[58] Field of Search .................................. 277/409, 411, 277/412, 415, 418, 419, 420, 429, 431, 437, 445, 417, 447, 361, 365, 370, 371; 384/132, 144, 477, 478, 480

[56] References Cited

U.S. PATENT DOCUMENTS

| | | | |
|---|---|---|---|
| 3,047,299 | 7/1962 | Karsten | 277/431 X |
| 3,315,968 | 4/1967 | Hanlon | 277/361 |
| 4,270,760 | 6/1981 | Greiman | 277/431 X |
| 4,314,705 | 2/1982 | Shimuzu | 277/429 X |
| 4,447,062 | 5/1984 | Leicht | 277/419 X |

*Primary Examiner*—Eric K. Nicholson
*Assistant Examiner*—Greg Binda
*Attorney, Agent, or Firm*—Dowell & Dowell, P.C.

[57] ABSTRACT

An improved seal assembly for a bearing housing is provided and includes piston rights which do not contact the rotating shaft, and a grease supply passageway connected to a labyrinth, and a grease purging passageway exiting axially through the seal assembly.

1 Claim, 5 Drawing Sheets

5,904,356

LABYRINTH SEAL WITH CONTAMINANT PURGING PASSAGEWAY FOR BEARING HOUSINGS

CROSS REFERENCE TO RELATED APPLICATION

This application is based on U.S. Provisional Application Serial No. 60/025,182 filed Sep. 11, 1996 in the name of the same inventor which file should be incorporated herein.

FIELD OF THE INVENTION

The present invention relates to seals for bearing housings and in particular to seals for use in high contamination environments.

BACKGROUND OF THE INVENTION

Seals for bearing assemblies are necessary in machines such as pumps, turbines, agitators and the like to seal bearings contained in housing. The bearings in the housing support shafts which normally protrude from both ends of the bearing housing.

The bearings require lubrication and an absence of contaminants to properly operate. At the point where the shaft protrudes from the bearing housing seals are necessary. Due to the rotation of the shaft and the stationary housing it is also necessary to use seals which minimize frictional losses and heat generation.

In high contaminant environments effective sealing is especially important. Labyrinth seals are well-known in these types of applications wherein different members of the seal assembly interconnect to form a tortuous labyrinth making it especially difficult for contaminants to penetrate the seal and affect the bearings.

One type of seal is sometimes called a "Taconite Seal" which is a premium seal used for contaminated environments, ie. mining or heavy equipment operations where excessive dust and dirt particles are present. Taconite seals typically have a labyrinth and a number of additional sealing elements. Often these sealing elements include lip seals or v-ring seals which contact the surface of the shaft during rotation. In some cases these seals actually rotate with the shaft inducing friction, heat and ultimately seal failure. Most types of labyrinth seals include means to purge grease through the seal by applying grease into the labyrinth under pressure.

SUMMARY OF THE INVENTION

The present invention is directed to an improved structure and a better method of lubricating the interconnecting sealing elements and to purging grease from the labyrinth defined therebetween.

Specifically, it is an object of the invention to provide a seal for a bearing housing for use in high contaminant environments.

It is a further object of the invention to provide a seal for a bearing housing which can be configured to fit any standard SAF style pillow block (bearing housing).

It is a further object of the invention to provide a seal for a bearing housing that utilizes grease-purgeable labyrinth providing grease purging through the piston rings and through a second, axial grease escape passageway.

It is further object of the invention to provide such a seal for a bearing housing which includes a minimum of contact-type sealing element such as o-rings and piston rings.

Thus there is provided an improved seal assembly for a bearing housing for use in high contaminant environments including a generally fixed annular member and a rotatable annular member interconnected to form a labyrinth therebetween. The labyrinth is sealed using non-interfering piston rings which contact with the generally fixed member as opposed to the rotating member. Purging of contaminant from the labyrinth is achieved by applying grease through a supply channel to two distinct points in the labyrinth; one point being between the piston rings and the second point being between the piston rings and the atmosphere, thereby achieving superior purging.

BRIEF DESCRIPTION OF THE DRAWINGS

The present invention is depicted and described in the attached parts list and accompanying drawings wherein like reference numerals refer to like parts in the several views, and wherein.

DETAILED DESCRIPTION OF THE PREFERRED EMBODIMENT

Figure 1:
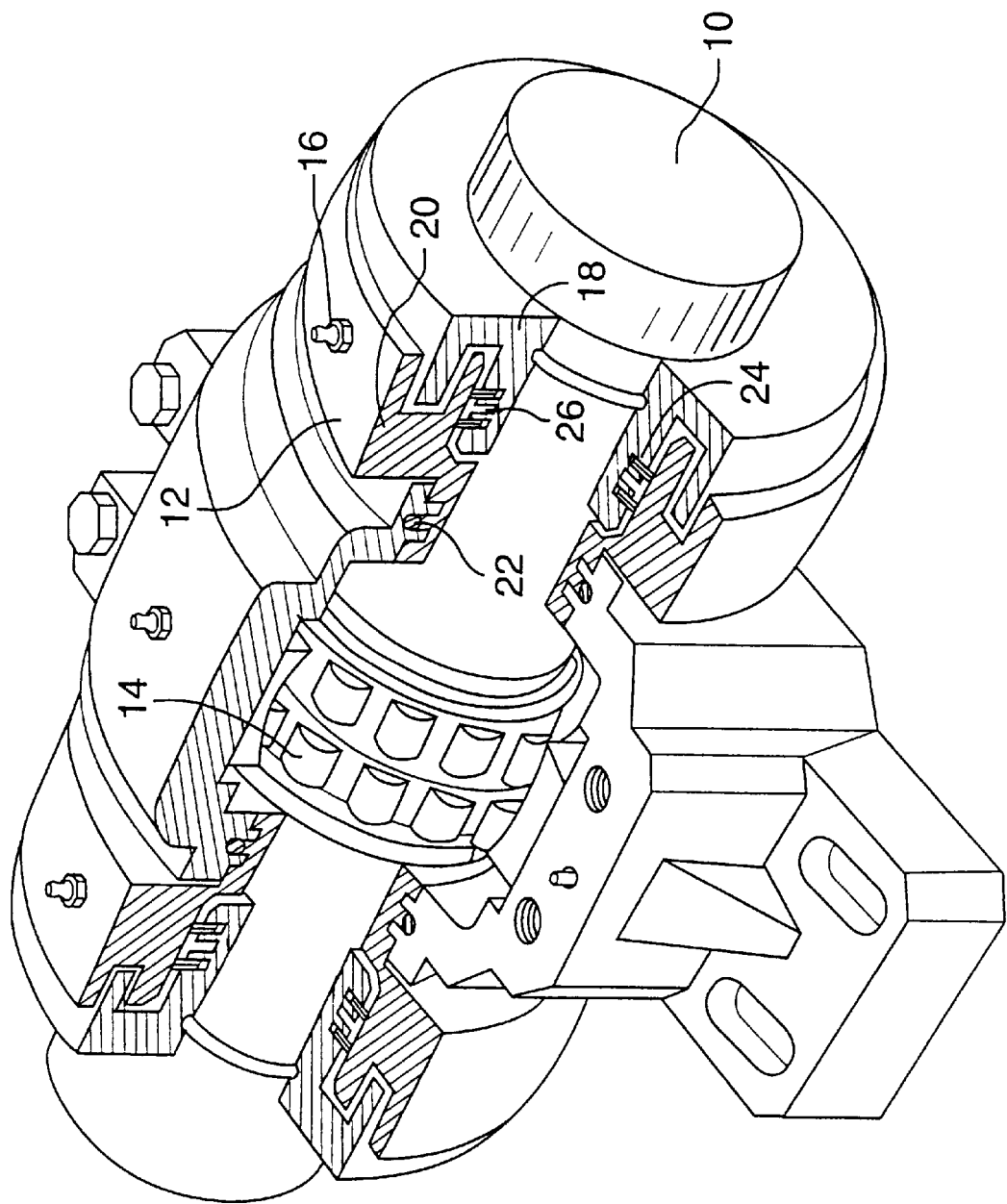
FIG. 1 is a perspective view in partial section of the seal and bearing configured in typical setup with a housing and a shaft.
Figure 2:
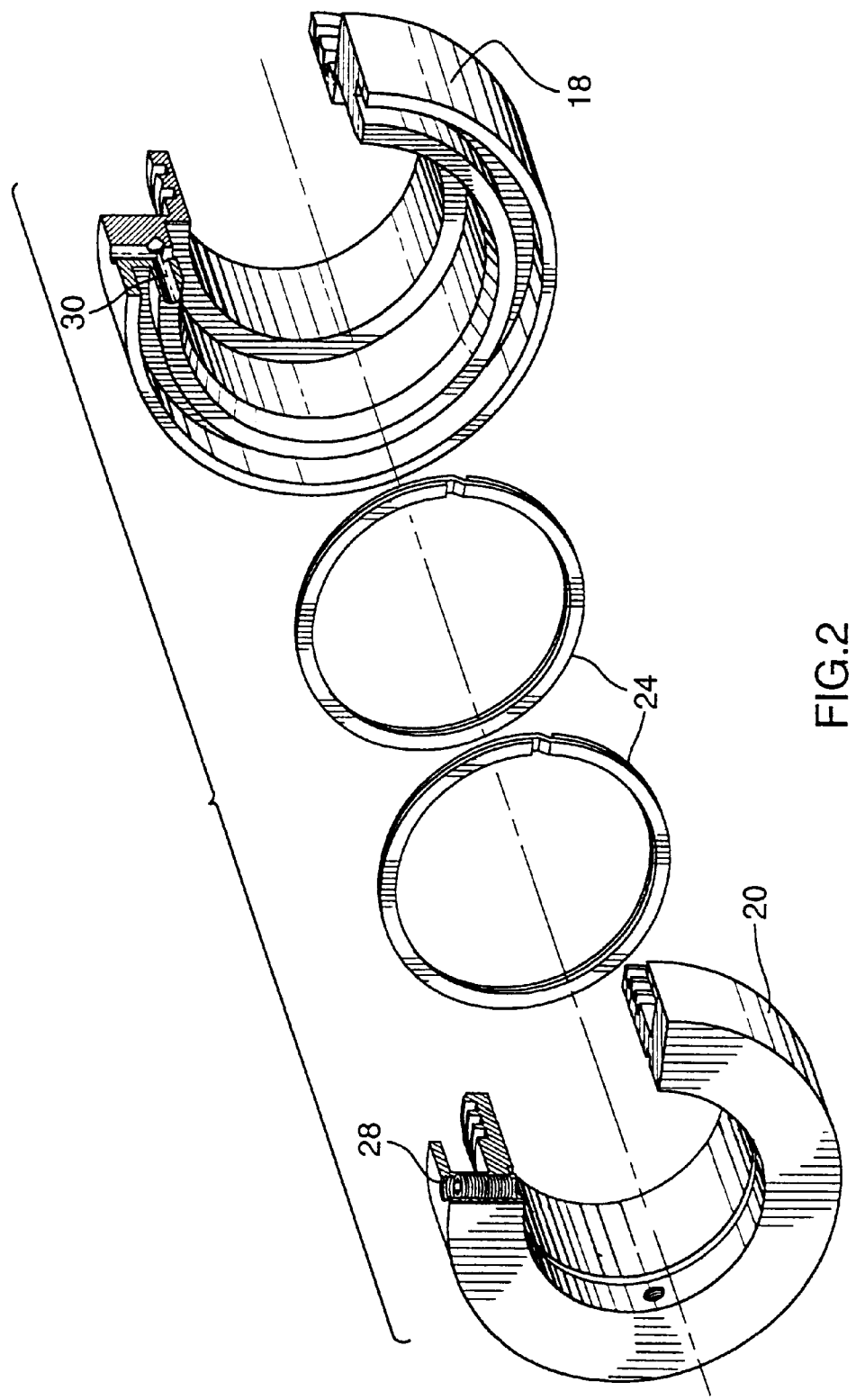
FIG. 2 is an exploded view of the seal assembly.
Figure 3:
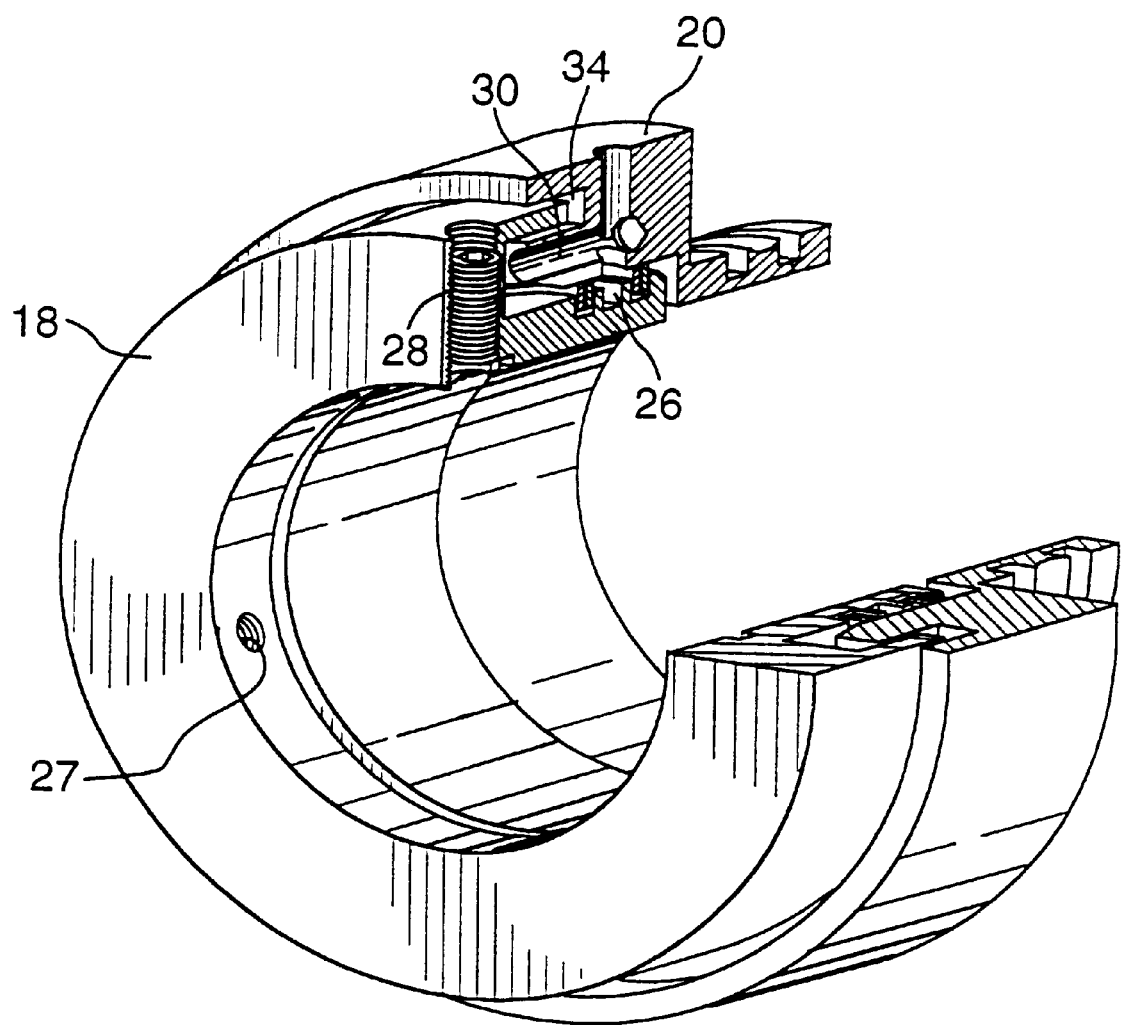
FIG. 3 is a sectional view of the seal assembly.
Figure 4:
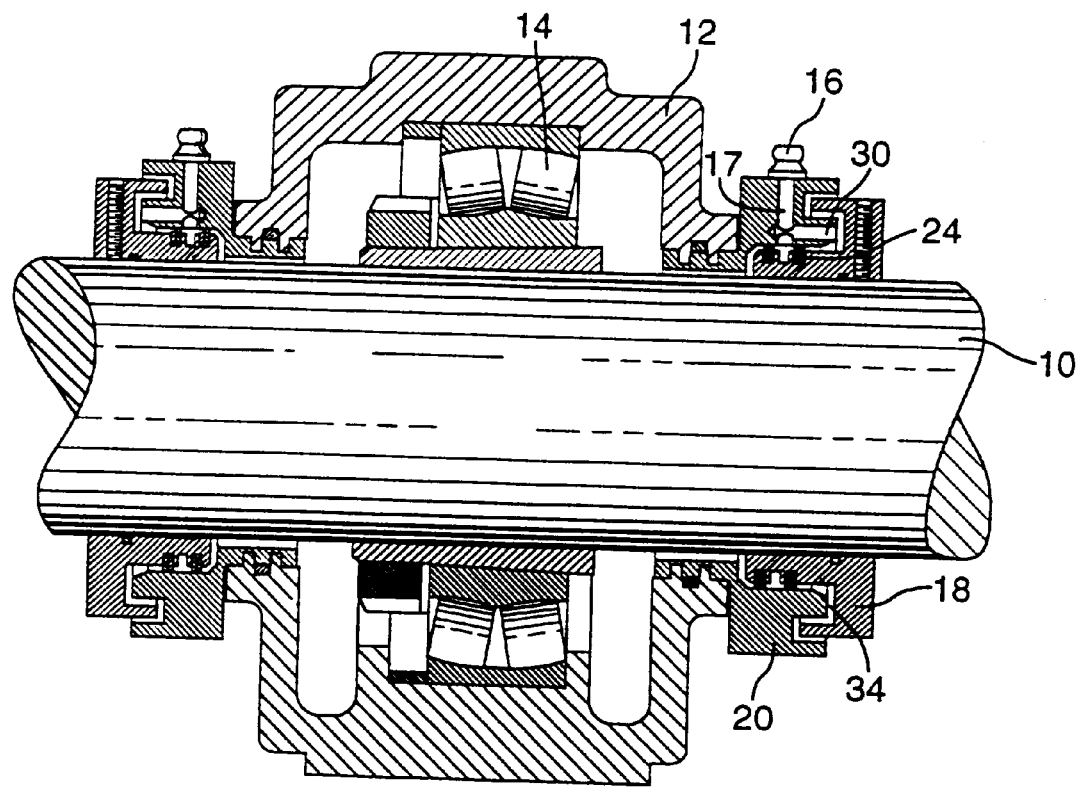
FIG. 4 is a cross-sectional view of the seal connected with the housing and shaft.

The seal assembly of the present invention is a Taconite-type seal. Referring to the figures the seal has two main parts; a first annular member termed an adapter ring 20, and a second annular member termed in flinger ring 18. These two rings interconnect and a labyrinth 34 is formed between them. The labyrinth makes it difficult for flying debris 36, dirt or other particles to penetrate the seal and enter the interior of the housing 12 and contaminate the bearings 14. (A pillow block style housing is shown in the drawings however a variety of bearing housing types could be adapted to.) The labyrinth is typically filled with grease 38 which enters through a top mounted grease fitting 16. The other main elements of the seal include o-ring 21 mounted adjacent the shaft 10, a larger o-ring 22 mounted at the interconnection with the pillow block housing 12 and two laminar piston rings 24 located between the adapter and flinger rings.

In operation, the flinger ring would normally rotate with the shaft (sometimes being secured thereto with a set screw 28, through a set screw opening 27) while the adapter ring remains stationary. The labyrinth is routinely cleaned by "purging" lubricant, typically grease, through the labyrinth. This is accomplished by inserting more grease into the lubricant or grease fitting. The grease enters the seal assembly through grease fitting 16 and then enters a second passageway termed the grease feed channel 17. This passage continues downwardly and connects with the labyrinth intermediate the piston rings. This second passageway also has a horizontal component termed the axial purge hole 30 which connects with the labyrinth between the rings and the atmosphere. Grease entering the fitting travels downwards between the two piston rings and also outwardly through the axial purge hole 30 and then exits the labyrinth. This way any particulate matter located in the beginning stage of the labyrinth is removed. This dual purging of the labyrinth provides superior removal of contaminant.

Most other taconite seals involve lip seals or v-rings which contact the shaft when it is rotating, and/or the seal actually rotate with the shaft. None of the sealing elements in the present seal assembly actually contact the shaft. This reduces wear substantially and prolongs seal and shaft life. Contact is eliminated by using only two laminar (piston) rings which both remain stationary. They do so by having their interference with the adapter 20 and not the flinger 18. This piston ring arrangement also allows a "grease dam" 26 to be formed between the rings.

Greater misalignment capabilities are also possible than with other prior art techniques that utilize contact seals. Generally, any misalignment in the shaft cause extreme wear on the contact seals thereby increasing the likelihood of contamination to the bearing and ultimately bearing failure. In the present invention greater misalignment capabilities are achieved by building in clearance in the labyrinth and in particular in the seating arrangement of the piston rings.

Figure 5:
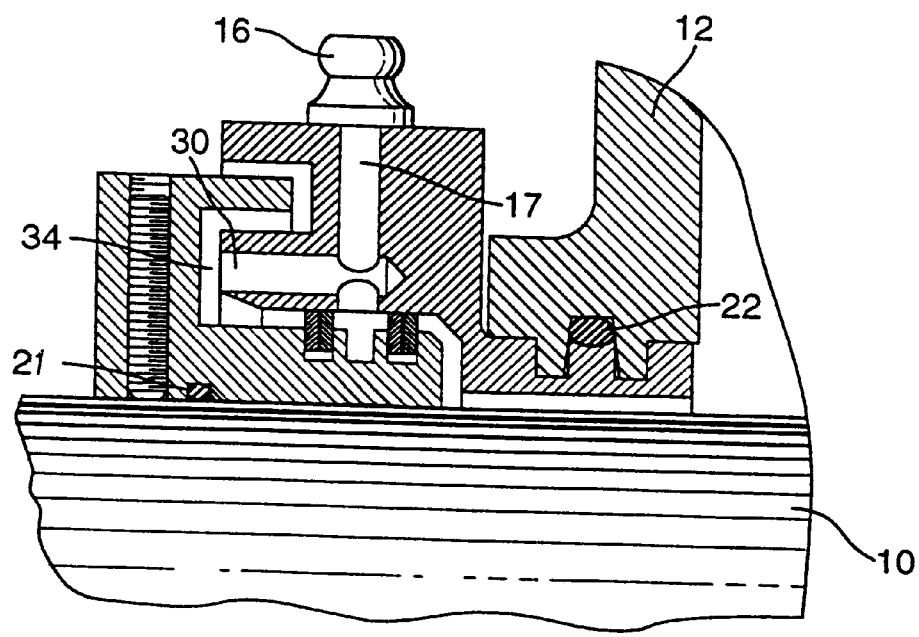
FIG. 5 is an exploded sectional view of the seal showing the labyrinth and grease passageways.
Figure 6:
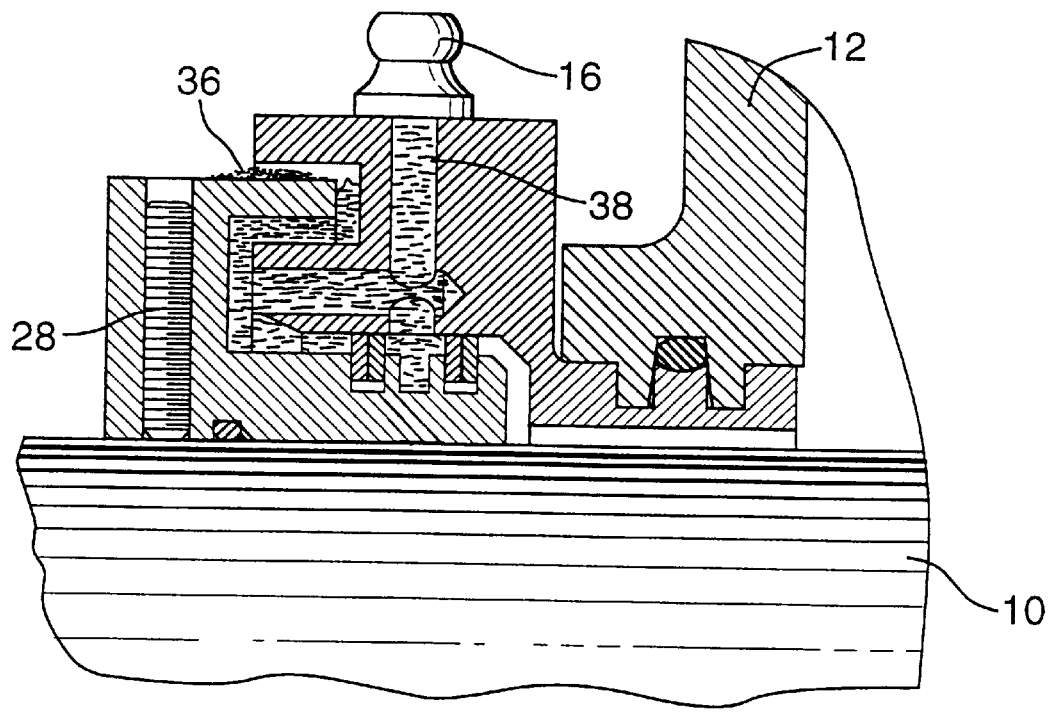
FIG. 6 is a further exploded sectional views showing contaminant in the labyrinth and the grease barrier.
Figure 7:
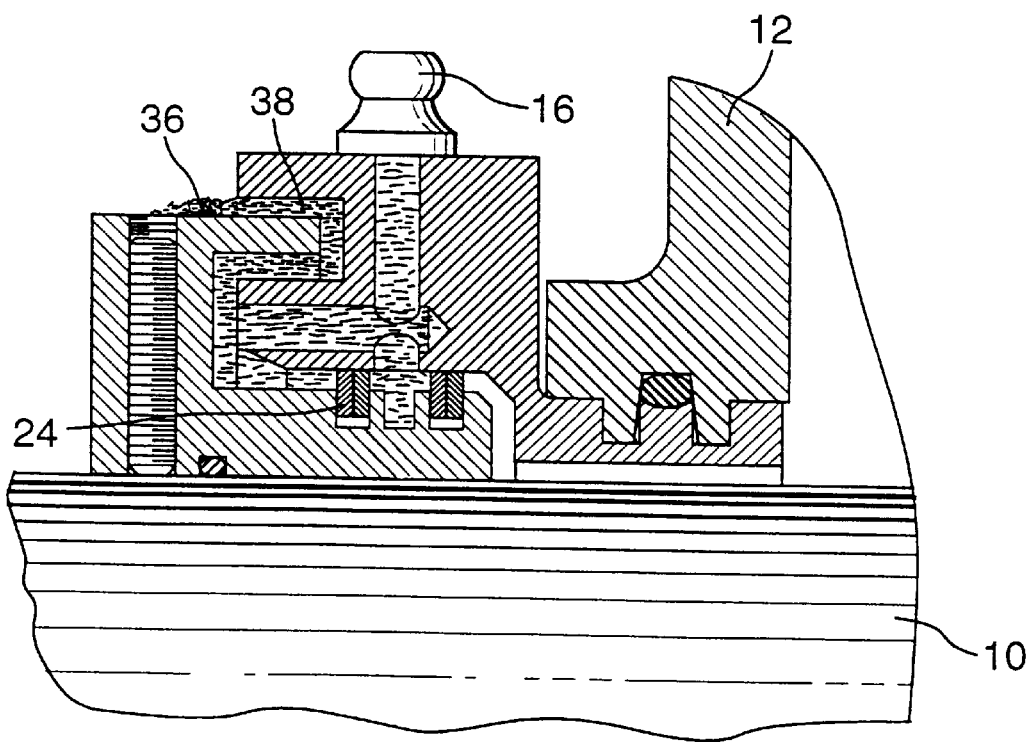
FIG. 7 is a further sectional view showing purging of the contaminant through the labyrinth by the grease.

Again referring to the labyrinth in FIG. 5, clear gaps between the rings 24 and the flinger 18 can be seen. This degree of clearance permits a maximum shaft misalignment of approximately ½ a degree which is exceptional for this type of seal.

The grease delivery system combined with the axial purge hole 30 are also new. Instead of requiring grease to be purged through the rings as in some prior art devices, purging occurs through a specific passageway.

It will be appreciated that the above description related to the preferred embodiments by way of example only. Many variations on the invention will be obvious to those knowledgeable in the field, and such obvious variations are within the scope of the invention as described and claimed, whether or not expressly described.

What is claimed as the invention is:

1. A seal assembly for a bearing housing for a rotating shaft comprising;

a first annular member configured to be used with said bearing housing;

a second annular member, rotatable with respect to said first annular member and configured to engage said rotating shaft;

said first and second annular members being positioned adjacent each other and having opposed axially and radially extending portions which intermesh and form a labyrinth leading from the atmosphere to said rotating shaft and providing for a restricted flow of lubricant therethrough;

a sealing element comprising at least two spaced apart piston rings positioned in the labyrinth, said piston rings being configured to interfere with said first annular member;

an external lubricant fitting;

a passageway connecting said lubricant fitting to the labyrinth at both a point intermediate said at least two piston rings, and at a point between the piston rings and the atmosphere thereby allowing lubricant purging over said piston rings and axially into the labyrinth.

\* \* \* \* \*